(12) United States Patent
Pankaj et al.

(10) Patent No.: US 8,176,102 B2
(45) Date of Patent: May 8, 2012

(54) TECHNIQUES FOR EXTENDING AND CONTROLLING ACCESS TO A COMMON INFORMATION MODEL (CIM)

(75) Inventors: Ashwin Pankaj, Bangalore (IN); Rajesh Ghiya, Bangalore (IN); Gosukonda Naga Venkata Satya Sudhakar, Bangalore (IN)

(73) Assignee: Oracle International Corporation, Santa Clara, CA (US)

( * ) Notice: Subject to any disclaimer, the term of this patent is extended or adjusted under 35 U.S.C. 154(b) by 899 days.

(21) Appl. No.: 12/212,842

(22) Filed: Sep. 18, 2008

(65) Prior Publication Data

US 2010/0017410 A1  Jan. 21, 2010
US 2011/0191376 A2  Aug. 4, 2011
US 2011/0276600 A2  Nov. 10, 2011

Related U.S. Application Data

(63) Continuation-in-part of application No. 12/173,971, filed on Jul. 16, 2008.

(51) Int. Cl.
G06F 12/00 (2006.01)
G06F 17/30 (2006.01)

(52) U.S. Cl. ...................................... 707/822
(58) Field of Classification Search .................. 707/822
See application file for complete search history.

(56) References Cited

U.S. PATENT DOCUMENTS

| | | | |
|---|---|---|---|
| 6,728,716 B1 * | 4/2004 | Bhattacharya et al. ............... | 1/1 |
| 6,854,122 B1 | 2/2005 | Sheriff et al. | |
| 7,043,732 B2 | 5/2006 | Mandal et al. | |
| 7,162,486 B2 * | 1/2007 | Patel et al. ............................ | 1/1 |
| 7,480,789 B1 | 1/2009 | Donlin et al. | |
| 2002/0123966 A1 | 9/2002 | Chu et al. | |
| 2004/0025142 A1 | 2/2004 | Mandal et al. | |
| 2005/0138040 A1 | 6/2005 | Lamb et al. | |
| 2006/0036570 A1 | 2/2006 | Schaefer et al. | |
| 2007/0240165 A1 | 10/2007 | Carey et al. | |
| 2007/0250363 A1 | 10/2007 | Boykin et al. | |
| 2008/0028058 A1 * | 1/2008 | Shaw et al. .................. | 709/223 |
| 2008/0066060 A1 | 3/2008 | Sonderegger | |
| 2008/0120327 A1 | 5/2008 | Bhat | |
| 2008/0126405 A1 | 5/2008 | Yin et al. | |
| 2008/0228770 A1 | 9/2008 | Halcrow et al. | |
| 2008/0288506 A1 * | 11/2008 | Brown ........................... | 707/10 |
| 2010/0017422 A1 | 1/2010 | Sudhakar et al. | |

OTHER PUBLICATIONS

"Novell Open Enterprise Server—Open WBEM Services Administration Guide for OES", (Oct. 25, 2006).

(Continued)

*Primary Examiner* — Angela Lie
*Assistant Examiner* — Kris Mackes
(74) *Attorney, Agent, or Firm* — Osha • Liang LLP

(57) ABSTRACT

Systems and methods for extending and controlling access to a Common Information Model (CIM) are presented. According to an embodiment, access requests for a CIM object manager (CIMOM) pass through a CIM file system (CIMFS) where each access requested is authenticated. The CIMFS maintains and manages a hidden file system representing CIM classes and a CIM class hierarchy on a volume of storage. The structure, metadata, and values for the CIM classes, CIM object, and CIM providers are maintained in a hidden directory on the volume. This information is accessible via the CIMFS to use existing file system management operations.

10 Claims, 4 Drawing Sheets

OTHER PUBLICATIONS

Davis, Darren R., "An Introduction to WBEM and OpenWBEM in SUSE Linux", http://www.novell.com/coolsolutions/feature/14625.html, (Posted Apr. 15, 2005), 5 pgs.

Kaur, Ramandeep, "AppNote: Modeling and Writing a Common Information Model (CIM) Provider", http://www.novell.com/coolsolutions/appnote/14816.html, (Posted May 10, 2005), 17 pgs.

Wessels, J. R., "Adding other File Systems or Network Resources to your NSS File System", (Posted Dec. 15, 2005), 2 pgs.

* cited by examiner

TECHNIQUES FOR EXTENDING AND CONTROLLING ACCESS TO A COMMON INFORMATION MODEL (CIM)

RELATED APPLICATIONS

The following application is a continuation-in part of, is co-pending with, and claims priority to, U.S. application Ser. No. 12/173,971 entitled "File System Interface for CIM," and filed on Jul. 16, 2008; the disclosure of which is incorporated by reference herein.

BACKGROUND

Common Information Model ("CIM") is a standard set forth by the Distributed Management Task Force ("DMTF"). CIM is an object oriented model to represent a wide variety of systems in a standard and neutral way, and is commonly referred to as the CIM schema. CIM is an open standard that defines how managed elements in an IT environment are represented as a common set of objects and relationships between them. CIM promotes consistent management of these managed elements, independent of their manufacturer or provider. That way a common component such as a server or a network router will be represented in a way that all management tools that use CIM will understand.

A related standard is Web-Based Enterprise Management (WBEM, also defined by DMTF) which defines a particular implementation of CIM, including protocols for discovering and accessing such CIM implementations. To create a standard way to access CIM, a working group of the DMTF developed a technique where CIM data can be accessed using the HTTP protocol used by the World Wide Web. Another standard used represents the CIM data in XML format. This gives us a common model for system management, a standard way to represent that model, and a standard way to access the model.

A CIM object manager ("CIMOM") is essentially a server for servicing CIM requests. A CIM provider provides data representing a single entity. In the case of hardware, there will theoretically be an instance of a CIM object representing each component, including, for example, each processor, video card, etc. Each of these sources has its own interface, some of which are very complex. There could be a representation of each component in only one, many, or all of the available data sources.

CIM providers typically do not implement auditing and authorization/access control frameworks for CIM operations. In addition, currently there are no viable means to easily take snapshots of the current status of CIM objects. Building such a framework around each of the CIM providers is time consuming and not feasible with existing approaches in the industry. Moreover, even for static data, there are no caching or proxy capabilities in CIM in the industry today. Still further, the ability to lock and synchronize CIM classes for purposes of doing atomic operations are not available in the industry.

Thus, improved techniques are needed for extending and controlling access to a CIM.

SUMMARY

Techniques for extending and controlling access to a Common Information Model (CIM) are provided. More specifically and according to a method embodiment, requests are detected for a CIM object manager (CIMOM). Next, assurances are made so that each request is initially processed by a CIM file system (CIMFS). The CIMOM is incapable of validating and handling any particular request unless that particular request is passed to the CIMOM by the CIMFS.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their equivalents.

DETAILED DESCRIPTION

The present subject matter provides an extension to the File System Interface Application filed as U.S. patent application Ser. No. 12/172/971, filed on Jul. 16, 2008 having a common assignee of Novell, Inc. of Provo, Utah; the disclosure of which is incorporated by reference herein.

Furthermore, the present subject matter (as described more completely herein and below) ensures that access to a Common Information Module (CIM) object manager (CIMOM) occurs via a CIM file system (CIMFS) interface, such as the interface discussed above. In addition, the CIMFS provides extended capabilities that permit a hidden file system to be maintained and managed on a volume of storage as a hidden directory.

The hidden directory includes metadata, CIM classes, a CIM class hierarchy, CIM object and provider values, and various beneficial attributes (discussed herein and below). The information in the hidden directory permits file management operations to be used with CIM access that occurs via the CIMOM, such as authentication, access control, snapshots, version control, replications, synchronization, caching, auditing, logging, and proxy processing.

By controlling access to the CIMOM via an enhanced CIMFS extended file management operations are capable. These operations permit CIM classes, objects, and providers to benefit from improved management and support that heretofore have not been capable with existing industry approaches.

It is within this context that embodiments of the invention are now discussed within the context of the FIGS. 1-5.

Figure 1:
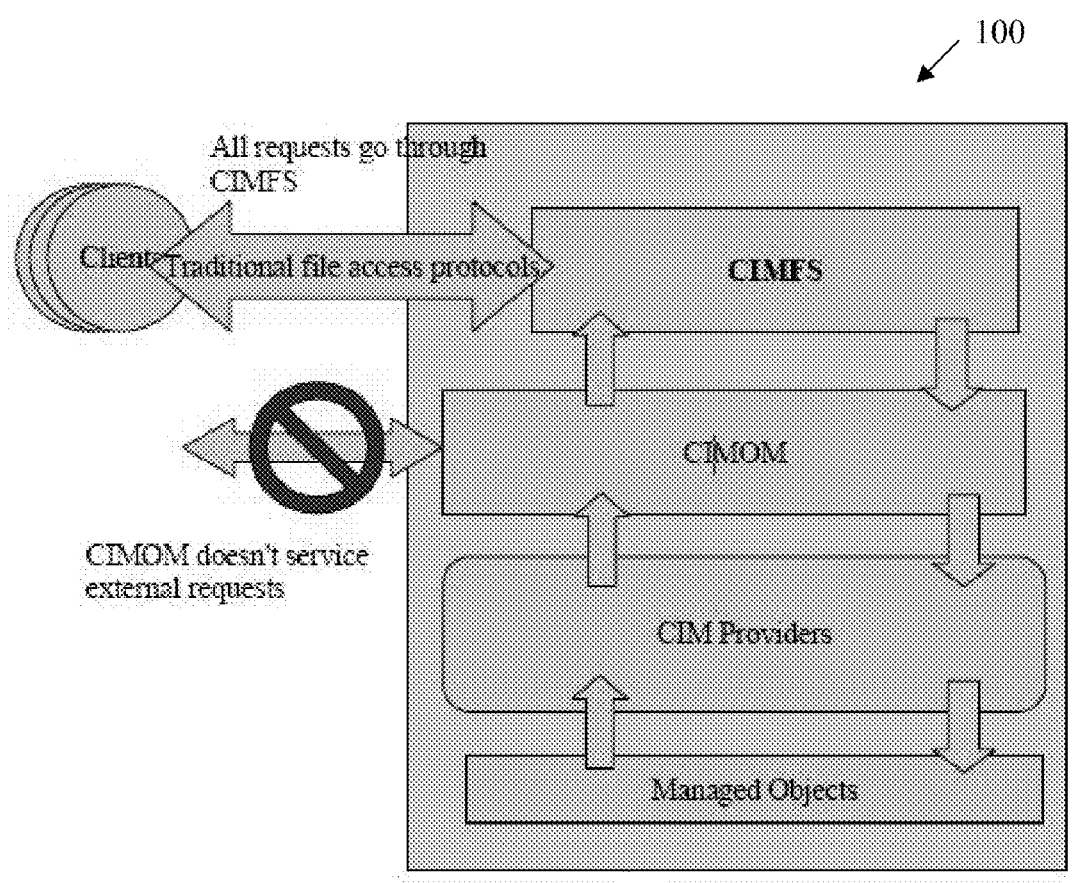
FIG. 1 illustrates an example architecture for extending and controlling access to a Common Information Model (CIM), according to an example embodiment.

FIG. 1 illustrates example architecture 100 for extending and controlling access to a Common Information Model (CIM), according to an example embodiment. The illustrated architecture 100 is presented for purposes of comprehension and embodiments presented herein are not to be limited to just the presented architecture 100 of the FIG. 1. For example, a proxy implementation can be used to sit in front of the CIMOM, such that each access request coming to the CIMOM passes through the proxy and each response coming out of the CIMOM passes through the proxy.

The architecture 100 limits user interactions with CIM objects through an enhanced CIMFS. This can be done via the architecture 100 by limiting the Internet Protocol (IP) address on which the CIMOM listens to that of local IP address port and by using a Pluggable Authentication Module (PAM); so that the authentication information is only with the CIMFS and a root. So, external requests do not reach the CIMOM directly. Furthermore, internal requests from other internal users in the same system are not serviced directly by CIMOM; rather they first must pass through the enhanced CIMFS.

Initially, the CIMFS is exported as a volume for the file access protocols like Network File System (NFS), Common Internet File System (CIFS), Apple Filing Protocol (AFP), and/or Netware Core Protocol (NCP). Thus, with the embodiments presented herein all requests for CIM object operations are forced to go through the enhanced CIMFS.

Implementation of components of the architecture can occur in a variety of manners. Consider the following example implementation.

Hidden CIM File System & Database:

There is one actual/real (in contrast with the virtual one in CIMFS) directory structure on the file system, which is not accessible to anyone except root and the CIMFS and which has the same names of the CIM classes and class hierarchy. This is designated as a hidden FS since it is hidden from all other users of the network. This is different from the CIMFS itself. For example there is a following hidden directory structure:

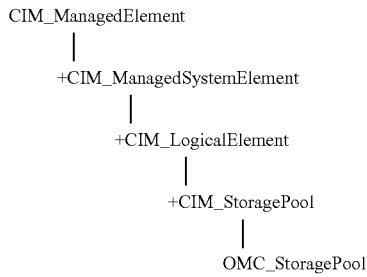

The directory structure represents the hierarchy of the classes for CIM_StoragePool as is mentioned in a CIM schema.

The attributes, the Access Control Lists (ACLs), etc., are stored in directory metadata with the hidden directory structure. The CIMFS reads the metadata of this directory structure and shows it as the metadata of the corresponding directories in the virtual CIMFS. When the user sets any of the metadata (like ACLs) then that change is set for the directories in the hidden file system (FS) of hidden directory structure. Similarly, for the files in the virtual CIMFS, which are actually CIM instances, and for each of the files (like attributes in CIMFS) the corresponding files can be found in the CIM directory of the hidden FS and the data and/or the metadata set appropriately.

In an embodiment, there is also a filter schema. This can be manually created. So, for each of the classes and members, they are designated with some special attributes that are not defined in the corresponding CIM schema. One of the attributes can be of a static type. When this attribute is present, the information is treated as static information and cached by the enhanced CIMFS. This is done by copying the member's value into the hidden FS. One example of the static information is the processor member of a CIM hierarchy.

With these changes that control how the CIMOM is accessed and with the enhancements to the CIMFS, the following file system management operations can now be provided to CIM implementations, which have heretofore been unavailable in the industry.

Authentication

CIM already provides authentication through modules such as PAM. But this is not typically exposed to user. The enhanced CIMFS is exposed to clients requesting CIMOM services through traditional file access protocols. These file access protocols already support a myriad of authentication mechanisms and it is up to the administrator to choose the one most suited for a particular network installation. User mapping need not be reflected in the CIMOM; i.e. CIMFS may connect to CIMOM using a single user account but clients can connect to CIMFS through their individual accounts.

Authorization and Access Control

The enhanced CIMFS maintains its own hidden file system. The file system access controls are custom set by a network administrator. Moreover, since this is exported as a NFS/CIFS/AFP/NCP mount, all the ACLs can coexist and work. They can even be integrated with directory services, as these file servers are often integrated with some Meta directory service such as eDirectory® (distributed by Novell, Inc. of Provo, Utah) or Active Directory® (distributed by Microsoft, Inc. of Redmond, Wash.).

Auditing

File system audit solutions are pretty common place nowadays but not available with CIM implementations. So, since the enhanced CIMFS behaves like any other file system after our modifications as discussed here, existing frameworks for auditing and logging can be reused with the enhanced CIMFS. Furthermore, these frameworks give the user operation made on each the files and also whether the user operations were successful or not.

Snapshots/Versioning

The enhanced CIMFS (which now behaves and looks like a file system) can also provide means to take point-in-time snapshots of the enhanced CIMFS file system objects, which in turn gives a reliable means to verify the current state of CIMOM objects. These snapshots can also be versioned too—thereby providing a means for trend analysis. Once the snapshot is requested, all operations are put on hold until the snapshot is completed. The snapshots may take several minutes to complete and when the snapshot is taken the snapshot takes a path as one of the parameters where it copies all the CIMFS data. Thereby, creating a literal "point-in-time copy" according to the definition of snapshot.

Read-Only Replicas

Another use for the enhanced CIMFS snapshots is that they can be used as read-only replicas. This can be useful on objects, which are continuously read but rarely modified, thereby reducing the load on the CIMOM provider.

Synchronization

The enhanced CIMFS can also provide a synchronization mechanism to clients, which the clients can use by holding exclusive locks on file system objects. So, another client trying to modify a same object that is locked is blocked until the current request is completed.

Caching and Proxy Processing

The actual instance's data (virtual CIM file) is read and copied into the file in the hidden FS. When a request comes to read from the CIM file in the enhanced CIMFS, the data is read from the file in the hidden FS for that file's static contents. Proxy services can also now be overlaid and used with the enhanced CIMFS, which previously could not be achieved.

Figure 2:
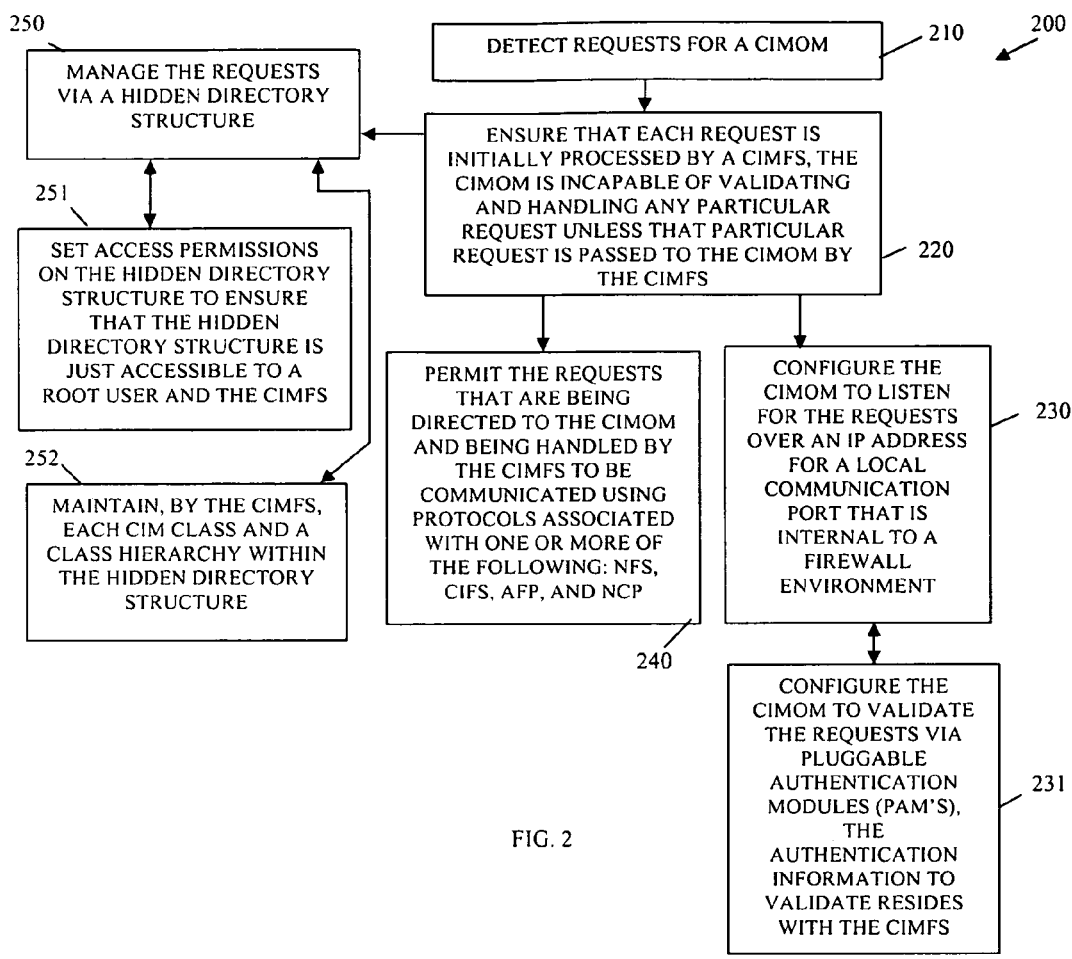
FIG. 2 illustrates a method for extending and controlling access to a CIM, according to an example embodiment.

FIG. 2 illustrates a method 200 for extending and controlling access to a CIM, according to an example embodiment. The method 200 (hereinafter "CIM control service") is implemented as instructions within a computer-readable storage medium and processes on one or more machines (computers or processor-enabled devices) over a network. The network is wired, wireless, or a combination of wired and wireless.

The CIM control service is designed and implemented to prevent any user requests to a CIMOM without first passing through an enhanced CIMFS. The enhanced CIMFS (simply referred to herein and below as "CIMFS") provides a variety of other features as discussed above and below herein.

At 210, the CIM control service detects requests being made for a CIMOM. The requests may be directed to a particular CIM object or CIM provider and may have initiated from a user or even an automated script or service. Moreover, the requests can originate internal to a local area network (LAN) of the CIMOM, such as internal to a firewall environment, and/or the requests can originate externally over a wide area network (WAN), such as the Internet. The external requests originate from outside the firewall environment of the CIMOM.

At 220, the CIM control service ensures that each request is initially processed by a CIMFS. Moreover, the CIMOM is incapable of handling any particular request unless that particular request is passed to the CIMOM by the CIMFS. If by chance a request penetrates and is provided to the CIMOM, the CIMOM is incapable of authenticated said request and will ignore it because the authentication mechanisms (as discussed herein and below) reside with the CIMFS.

According to an embodiment, at 230, the CIM control service configures the CIMOM to listen for the requests over an IP address for a local communication port that is internal to a firewall environment of the CIMOM. In other words, the CIMOM sits inside a firewalled and protected environment and is accessible only through a local IP port that cannot be accessed from outside the firewalled environment.

Continuing with the embodiment at 230 and at 231, the CIM control service also configures the CIMOM to validate requests via pluggable authentication modules (PAM's). The authentication information for validation of the requests resides with the CIMFS. The details of this situation were discussed above with reference to the architecture 100 of the FIG. 1. So, just the CIMFS can validate requests on behalf of the CIMOM. In this manner, should an internally generated request be issued inside the firewalled environment of the CIMOM, the CIMOM still cannot process it because it cannot authenticate it, since the authentication mechanisms reside with the CIMFS.

In an embodiment, at 240, the CIM control service permits requests that are being directed to the CIMOM and being initially handled by the CIMFS to be communicated using existing file system protocols, such as but not limited to, Network File System (NFS), Common Internet File System (CIFS), Apple Filing Protocol (AFP), Netware Core Protocol (NCP), and others.

In yet another situation, at 250, the CIM control service manages each of the requests via a hidden directory structure or hidden file system, such a hidden directory structure was discussed at length above with reference to the architecture 100 of the FIG. 1.

Continuing with the embodiment at 250 and at 251, the CIM control service sets access permissions on the hidden directory structure to ensure that the hidden directory structure is just and only accessible to a root user with proper permissions and the CIMFS.

Also continuing with the embodiment at 250 and at 252, the CIM control service maintains, via the CIMFS, each CIM class and a CIM class hierarchy within the hidden directory structure.

The processing of the CIM control service illustrates how initially all access to a CIMOM is passed through a CIMFS. The CIMFS is enhanced to manage each CIM class, CIM object, CIM provider, and CIM class hierarchy via a hidden directory structure that just the CIM control service has access to (and perhaps a root administrator). This permits a variety of extended features that can be achieved with CIM's, some of which were discussed above and are further discussed below with respect to the remaining FIGS. 3-5.

Figure 3:
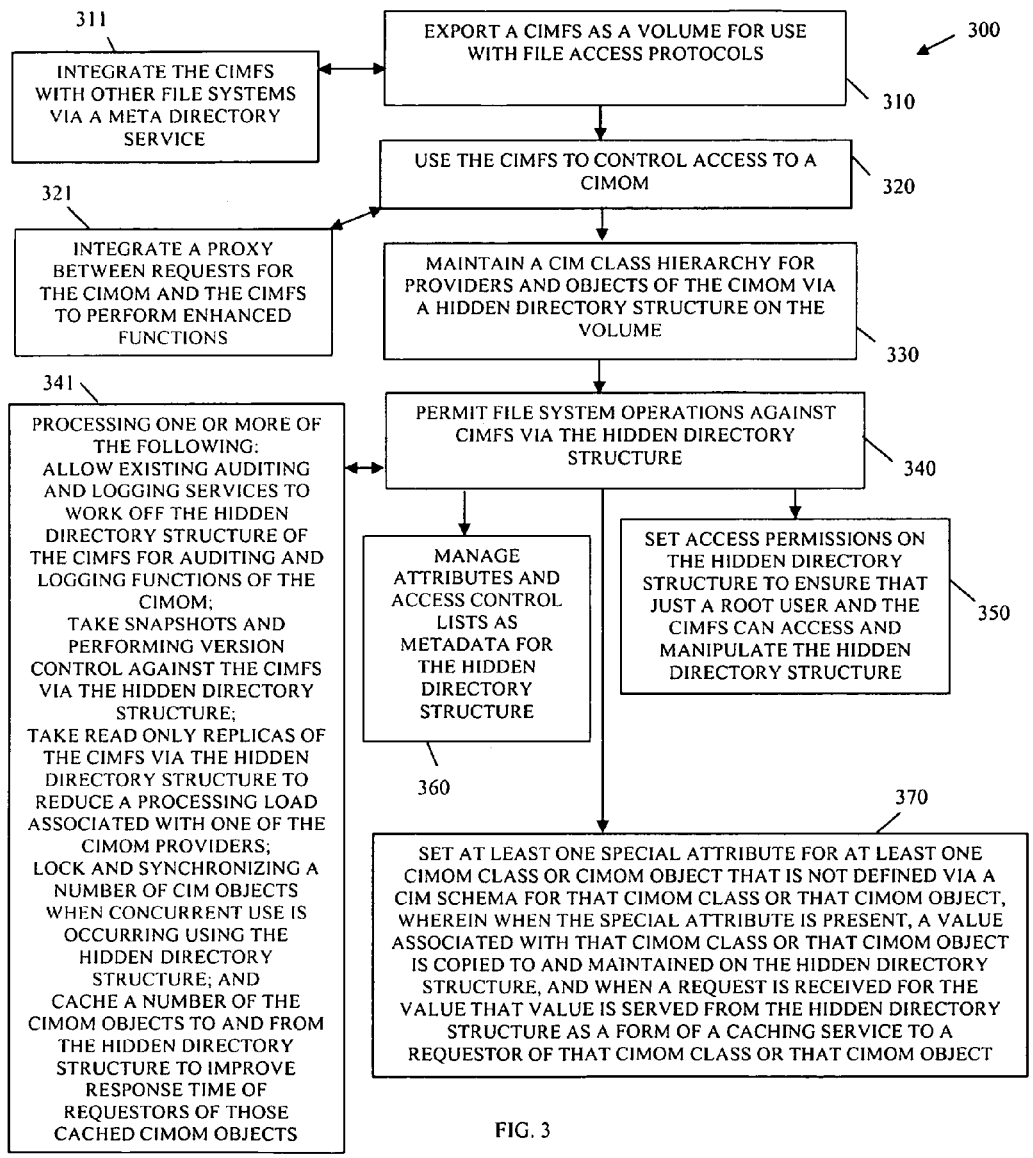
FIG. 3 illustrates another method for extending and controlling access to a CIM, according to an example embodiment.

FIG. 3 illustrates another method 300 for extending and controlling access to a CIM, according to an example embodiment. The method 300 (hereinafter referred to as "an extended CIMFS") is implemented in a computer-readable storage medium as instructions. The instructions when processed by a machine (computer or processor-enabled device) perform the processing depicted in the FIG. 3. Moreover, the extended CIMFS is operational over a wired, wireless, or combination of wired and wireless network.

The extended CIMFS may also be referred to as an enhanced CIMFS. It is enhanced from existing CIMFS, such as the CIMFS discussed above and incorporated by reference herein. The enhancements permit the CIMFS to present itself as a normal file system and to utilize existing file management operations. The details of which were discussed above with reference to the architecture of the FIG. 1 and herein and below.

At 310, the extended CIMFS exports a CIMFS as a storage volume for use with existing or custom file access protocols. Some of these protocols were discussed above with reference to the FIGS. 1 and 2, respectively.

According to an embodiment, at 311, the extended CIMFS integrates the exported CIMFS with other file systems via a Meta Directory Service, such as eDirectory® (distributed by Novell, Inc. of Provo, Utah) or Active Directory® (distributed by Microsoft, Inc. of Redmond, Wash.). This permits the components and metadata of the CIMFS to be managed via a single tool or structure along with other file systems and their corresponding directory structures. So, the extended CIMFS can integrate the CIMFS associated with CIM's for use with Meta Directory Services, this improves management, analysis, and support of CIM's.

At 320, the extended CIMFS uses the CIMFS to control access to a CIMOM. Again, users or automated services are incapable of accessing the CIMOM directly and even if they do by some attempted circumvention of the processing, the CIMOM cannot authenticate the request and will thusly ignore it because the authentication mechanism resides with the CIMFS.

In an embodiment, at 321, the extended CIMFS integrates a proxy between requests for the CIMOM and the CIMFS to perform enhanced functions as discussed herein. So, in addition to the local port listening mechanism discussed above with reference to the architecture 100 of the FIG. 1 and the method 200 of the FIG. 2, a proxy implementation can acquire all requests going into the CIMOM. The proxy can be a transparent proxy, such that clients are completely unaware of the presence of the proxy. In another case, the proxy can also be a reverse proxy, such that all responses coming out of the CIMOM are handled by the proxy before delivery to a requestor (user or automated script or automated service).

At 330, the extended CIMFS maintains a CIM class hierarchy for providers and CIM objects of the CIMOM via a hidden directory structure or hidden file system (the phrases "hidden directory structure" and "hidden file system" may be used interchangeably and synonymously herein). Examples of this hidden directory structure and actions of the CIMFS were discussed above with reference to the architecture 100 of the FIG. 1.

At 340, the extended CIMFS permits file system operations against the CIMFS via the hidden directory structure. A variety of file management operations can be performed.

For example, at 341, the extended CIMFS can perform one or more of any of these types of file management operations: 1) allow for existing auditing and logging services to work off the hidden directory structure via interactions with the CIMFS, this is done for auditing and logging functions of the CIMOM; 2) take snapshots and/or perform version control against the CIMFS and its objects or providers via the hidden directory structure as exposed by the CIMFS; 3) take read only replicas of the CIMFS via the hidden directory structure so as to reduce in some instances processing loads associated with one or more of the CIMOM providers and their processing; 4) lock and synchronize a number of the CIMOM objects when concurrent use is occurring using the hidden directory structure; 5) caching a number of the CIMOM objects to and from the hidden directory structure to improve response time of requestors (users or automated services) of those cached CIMOM objects; and 6) providing proxy services to the CIMOM objects and providers via the hidden directory structure.

According to an embodiment, at 350, the extended CIMFS sets access permissions on the hidden directory structure to ensure that just a root user and the CIMFS can access and manipulate the hidden directory structure. This was discussed in detail above with reference to the FIGS. 1 and 2, respectively.

In another embodiment, at 360, the extended CIMFS manages attributes and access control lists (ACLS) as metadata for the hidden directory structure. Again, examples of this were provided above with reference to the architecture 100 of the FIG. 1.

In a particular case, at 370, the extended CIMFS sets at least one special attribute for at least one CIMOM class or CIMOM object that is not defined via a CIM schema for that CIMOM class or that CIMOM object. The special attribute when present results in a value associated with that CIMOM class or that CIMOM object being copied to and maintained on the hidden directory structure. So, when a request is received for the value that value is served from the hidden directory structure as a form of a caching service to a requester of that CIMOM class or that CIMOM objects. This was also discussed above with reference to the architecture 100 of the FIG. 1. It is noted that the caching can occur for a CIMOM provider as well and that the CIMOM provider may itself be considered a CIMOM object. This can be customized so that just static or non-changing objects or providers are cached to the hidden directory structure. In some cases, special utilizes can be implemented within the CIMFS to provide a full-suite of caching that defines when purging occurs, when retrieval occurs, when something is flagged as stale, etc.

Figure 4:
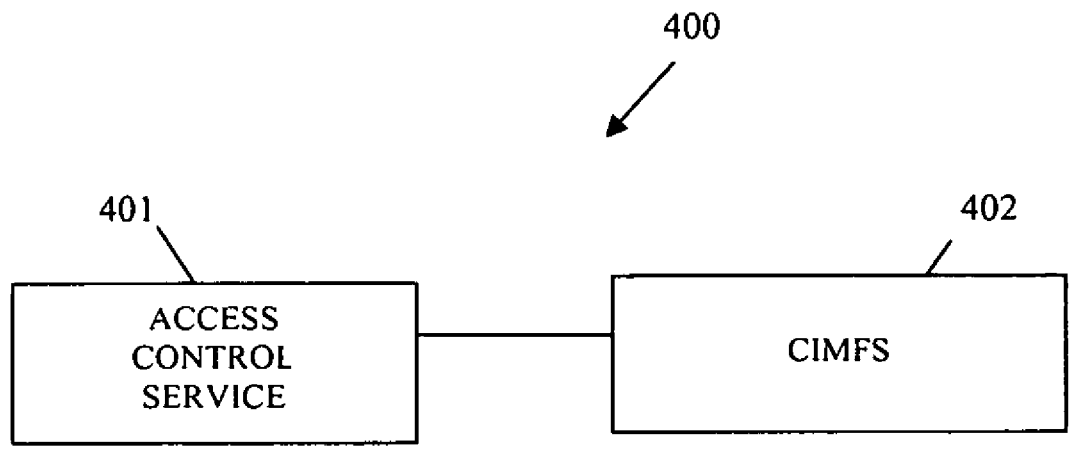
FIG. 4 illustrates a CIM access control system, according to an example embodiment.

FIG. 4 illustrates a CIM access control system 400, according to an example embodiment. The CIM access control system 400 is implemented as instructions within a computer-readable storage medium that are processed by machine(s) (computer(s) or processor-enabled device(s)) of a network. The network may be wired, wireless, or a combination of wired and wireless. Moreover, the CIM access control system 400 implements, among other things, the processing depicted above with respect to the methods 200 and 300 of the FIGS. 2 and 3, respectively. Additionally and in an embodiment, the CIM access control system 400 uses the architecture 100 presented and discussed above with reference to the FIG. 1.

The CIM access control system 400 includes an access control service 401 and an enhanced CIMFS 402. Each of these and their interactions with one another will now be discussed in turn.

The access control service 401 is implemented in a machine-accessible and computer-readable storage medium as instructions that process on one or more machines (computers or processor-enabled devices) over the network. Example processing associated with the access control service 401 was presented in detail above with reference to the method 200 of the FIG. 2.

The access control service 401 ensures that each request to a CIM object or a CIM provider made to a CIMOM passes initially through the CIMFS 402. This can be done in a variety of manners, such as port listening on a specified internal port, authentication for requests to the CIMOM controlled via just the CIMFS 402, and/or via a transparent and/or reverse proxy that intercepts and handles all incoming requests to the CIMOM and outgoing responses from the CIMOM.

So, in an embodiment, the access control service 401 is a proxy that intercepts each request made to the CIMOM within the network and passes each of those requests to the CIMFS 402. In another case, the access control service 401 is a hidden service that is part of a hidden file system.

In still another case, the access control service 401 configures the CIMFS 402 to include credentials for authenticating each request and again those credentials are not available to the CIMOM. Thus, the CIMOM cannot authenticate internally received requests or for that matter externally received requests.

In yet another situation, the access control service 401 configures the CIMOM to be accessible for handling requests via a local port IP address that can just and only be accessed within a firewalled environment. The CIMFS 402 is accessible via file system protocols from both internal to the firewalled environment and external to the firewalled environment.

The enhanced CIMFS 402 is implemented in a machine-accessible and computer-readable storage medium as instructions that process on one or more machines (computers or processor-enabled devices) over the network. Example processing associated with the enhanced CIMFS 401 was presented in detail above with reference to the methods 200 and 300 of the FIGS. 2 and 3, respectively. Additionally, the enhanced CIMFS 402 is a modified version of the CIMFS discussed above and incorporated by reference herein. It is designated as enhanced because it is modified to achieve the features discussed herein and below. From this point forward the enhanced CIMFS 402 is simply referred to as CIMFS 402; but it is to be understood that the CIMFS is a modified version of an existing CIMFS.

The CIMFS 402 maintains CIM classes and a CIM class hierarchy for the CIM object and the CIM provider via a hidden directory structure as a storage volume associated with a file system. The operating system (OS) and file system tools interact with the volume via the CIMFS 402 to provide file system management operations for the CIM classes, the CIM class hierarchy, the CIM object, and the CIM provider.

According to an embodiment, the CIMFS 402 interacts with the hidden directory to present the CIM classes, the CIM object, the CIM hierarchy, and the CIM provider as a new file system for use with the OS and the file system tools.

In an embodiment, the file system management tools include, by way of example only, access control and authentication operations, auditing operations, logging operations, snapshot operations, versioning operations, replica operations, synchronization and locking operations, proxy operations, and/or caching operations.

Figure 5:
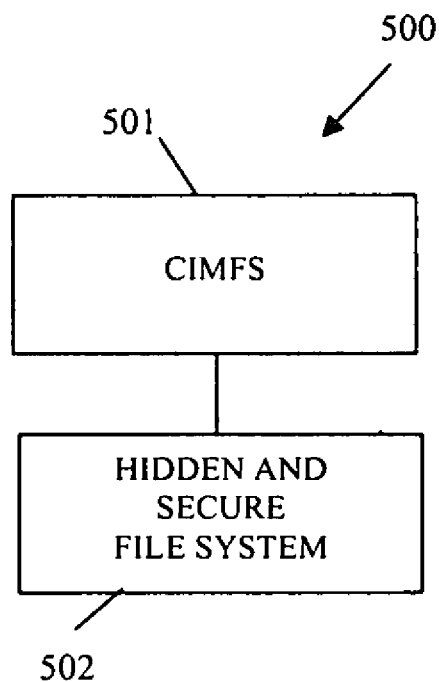
FIG. 5 illustrates another CIM access control system, according to an example embodiment.

FIG. 5 illustrates another CIM access control system 500, according to an example embodiment. The CIM access control system 500 is implemented as instructions within a computer-readable storage medium that are processed by machine(s) (computer(s) or processor-enabled device(s)) of a network. The network may be wired, wireless, or a combination of wired and wireless. Moreover, the CIM access control system 500 implements, among other things, the processing depicted above with respect to the methods 200 and 300 of the FIGS. 2 and 3, respectively. Additionally and in an embodiment, the CIM access control system 500 uses the architecture 100 presented and discussed above with reference to the FIG. 1. Still further, the CIM access control system 500 presents another perspective and in some ways enhanced perspective of the CIM access control system 400 presented above with respect to the system 400 of the FIG. 4.

The CIM access control system 500 includes CIMFS 501 and a hidden and secure file system 502. Each of these and their interactions with one another will now be discussed in turn.

The CIMFS 501 is implemented in a machine-accessible and computer-readable storage medium as instructions that process on one or more machines (computers or processor-enabled devices) over the network. Example processing associated with the CIMFS 501 was presented in detail above with reference to the methods 200 and 300 of the FIGS. 2 and 3, respectively, and with reference to the CIMFS 402 discussed above with reference to the system 400 of the FIG. 4.

The CIMFS 501 controls and manages the hidden and secure file system 502 as a hidden directory. Direct access to a CIMOM is prohibited and not allowed in any manner unless that access passes indirectly through the CIMFS 501.

In an embodiment, the CIMFS 501 is exported as a volume for use with existing file system protocols.

According to an embodiment, the CIMFS 501 validates each access request before permitting access to the CIMOM.

In another case, the CIMFS 501 permits custom caching to and from the hidden and secure file system 502 via the hidden directory for select CIM objects and CIM providers that are associated with the CIM classes and the CIM hierarchy.

The hidden and secure file system 502 is implemented in a machine-accessible and computer-readable storage medium as instructions that process on one or more machines (computers or processor-enabled devices) over the network. Example aspects of the hidden file system 502 was presented in detail above with reference to the methods 200 and 300 of the FIGS. 2 and 3, respectively, and with reference to the system 400 of the FIG. 4.

The hidden and secure file system 502 is represented via the hidden directory and includes CIM classes and a CIM class hierarchy for a CIMOM. The hidden directory and metadata associated with the hidden directory are used to permit existing file system management operations on the CIM classes that include CIM objects and CIM providers, which themselves can be CIM objects from CIM classes.

The hidden and secure file system 502 is considered secure because access is restricted to the underlying hidden directory so that just the CIMFS 501 or a root administrator with proper access privileges can access the hidden directory.

In an embodiment, the CIMFS 501 connects and interacts with the CIMOM via a special and single user directory account; but, other users of a directory connect to the CIMFS 501 via their individual directory accounts.

One now fully appreciates how auditing, authentication, and authorization to CIM object operations can be achieved even when the underlying CIM providers do not support such features. Additionally, access control to CIM classes can now be achieved and in a customized fashion. Still further, CIM objects can be snapshotted, versioned, created as read-only replicas, synchronized, audited, logged, cached, and benefit from proxy services.

One of ordinary skill in the art will understand that, the illustrated processes and entities can be implemented using software, hardware, and combinations of software and hardware. The methods illustrated in this disclosure are not intended to be exclusive of other methods within the scope of the present subject matter. Those of ordinary skill in the art will understand, upon reading and comprehending this disclosure, other methods within the scope of the present subject matter. The above-identified embodiments, and portions of the illustrated embodiments, are not necessarily mutually exclusive. These embodiments, or portions thereof, can be combined. In various embodiments, the methods are implemented as a set of instructions contained on a computer-accessible medium capable of directing a processor to perform the respective method. The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

The above detailed description is intended to be illustrative, and not restrictive. Other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A machine-implemented method, comprising:

exporting a Common Information Module (CIM) File System (CIMFS) as a volume for use with file access protocols;

using the CIMFS to control access to a CIM Object Manager (CIMOM);

maintaining a CIM class hierarchy for providers and objects of the CIMOM using a hidden directory structure on the volume;

processing, by the CMFS, file system operations CIMFS using the hidden directory structure; and setting at least one special attribute for at least one selected from a group consisting of a CIMOM class and a CIMOM object, wherein the special attribute is not defined in a CIM schema corresponding to the at least one selected from the group consisting of the CIMOM class and the CIMOM object, wherein when the special attribute is present, a value associated with a corresponding one selected from the group consisting of the CIMOM class and the CIMOM object is cached on the hidden directory structure, and wherein when a request is received for the value, which is cached in the hidden directory, is served from the hidden directory structure to a requestor that sent the request.

2. The method of claim 1, further comprising:

setting access permissions on the hidden directory structure to ensure that only a root user and the CIMFS can access and manipulate the hidden directory structure.

3. The method of claim 1, wherein the hidden data structure comprises an access control list for a directory in the hidden directory structure.

4. The method of claim 1, wherein exporting integrating the CIMFS with another file system using a meta directory service.

5. The method of claim 1, wherein the file system operation includes at least one selected from a group consisting of:
- allowing existing auditing and logging services to work off the hidden directory structure of the CIMFS for auditing and logging functions of the CIMOM;
- taking snapshots and performing version control against the CIMFS using the hidden directory structure; and
- taking read only replicas of the CIMFS using the hidden directory structure to reduce a processing load associated with one of the CIMOM providers.

6. A machine-implemented system, comprising:
- an access control service implemented in a computer-readable storage medium and to process on a network; and
- a common information model (CIM) file system (CIMFS) implemented in a computer-readable storage medium and to process on the network;
- wherein the access control service ensures that each request for a CIM object made to a CIM object manager (CIMOM) passes initially through the CIMFS, and wherein the CIMFS maintains CIM classes and a CIM class hierarchy for the CIM object using a hidden directory as a volume associated with a file system,
- wherein the access control service ensures that each request for a CIM provider made to the CIM object manager (CIMOM) passes initially through the CIMFS, and wherein the CIMFS maintains CIM classes and a CIM class hierarchy for the CIM provider using the hidden directory, and
- wherein an operating system and file system tools interact with the volume using the CIMFS to provide file system management operations for the CIM classes, the CIM class hierarchy, the CIM object, and the CIM provider,
- wherein the file system management operations comprise access control operations, auditing operations, logging operations, snapshot operations, versioning operations, replica operations, synchronization operations, proxy operations, and caching operations.

7. The system of claim 6, wherein the access control service is implemented using at least one selected from a group consisting of: a proxy that intercepts each request made to the CIMOM within the network and passes each request to the CIMFS and a hidden service that is part of a hidden file system.

8. The system of claim 6, wherein the access control service configures the CIMFS to include credentials for authenticating each request, and wherein the credentials are not available to the CIMOM.

9. The system of claim 6, wherein the access control service configures the CIMOM to be accessible for handling requests over a local port Internet Protocol (IP) address that can only be accessed within a firewall environment, and wherein the CIMFS is accessible via file system protocols from both internal to the firewall environment and external to the firewall environment.

10. The system of claim 6, wherein the CIMFS interacts with the hidden directory to present the CIM classes, the CIM object, the CIM hierarchy, and the CIM provider as a new file system for use with the operating system and the file system tools.

* * * * *

UNITED STATES PATENT AND TRADEMARK OFFICE
CERTIFICATE OF CORRECTION

PATENT NO. : 8,176,102 B2
APPLICATION NO. : 12/212842
DATED : May 8, 2012
INVENTOR(S) : Pankaj et al.

It is certified that error appears in the above-identified patent and that said Letters Patent is hereby corrected as shown below:

In column 2, line 34, delete "12/172/971," and insert -- 12/172,971, --, therefor.

In column 7, line 38, delete "(ACLS)" and insert -- (ACLs) --, therefor.

In column 10, line 48, in Claim 1, delete "CMFS," and insert -- CIMFS, --, therefor.

Signed and Sealed this
Thirty-first Day of July, 2012

David J. Kappos
*Director of the United States Patent and Trademark Office*